United States Patent [19]
Onishi

[11] Patent Number: 4,939,651
[45] Date of Patent: Jul. 3, 1990

[54] CONTROL METHOD FOR AN UNMANNED VEHICLE (ROBOT CAR)

[75] Inventor: Masanori Onishi, Ise, Japan

[73] Assignee: Shinko Electric Co., Ltd., Tokyo, Japan

[21] Appl. No.: 206,369

[22] Filed: Jun. 14, 1988

[51] Int. Cl.⁵ .................. G06F 15/50; B62D 1/02
[52] U.S. Cl. .................. 364/424.02; 180/167
[58] Field of Search ............ 364/424.01, 424.02, 364/424.05, 513, 443–444; 180/167, 168; 318/587

[56] References Cited

U.S. PATENT DOCUMENTS

| 4,710,020 | 12/1987 | Maddox et al. | 351/1 |
| 4,727,492 | 2/1988 | Reeve et al. | 364/424.02 |
| 4,772,832 | 9/1988 | Okazaki et al. | 318/587 |
| 4,777,416 | 10/1988 | George, II et al. | 318/568 |
| 4,815,008 | 3/1989 | Kadonoff et al. | 364/513 |
| 4,817,000 | 3/1989 | Eberhardt | 364/443 |
| 4,821,192 | 4/1989 | Taivalkoski et al. | 364/424.02 |

Primary Examiner—Thomas G. Black
Attorney, Agent, or Firm—Wenderoth, Lind & Ponack

[57] ABSTRACT

A method is for controlling a robotic vehicle having a control section and a travel section, in which the travel section is equipped with a transport device for transporting the robotic vehicle from a start location to a target location. According to the method, the control section is supplied with the target location. An optimal nodal path from the start location to the target location is then determined and defined by a plurality of successive nodes. A plurality of command sets for each of the plurality of successive nodes is respectively prepared. Each command set specifies at least a target speed and target direction of the robotic vehicle as the robotic vehicle is transported from a vicinity of one node to a vicinity of a next node. The plurality of command sets are output to the travel section of the robotic vehicle. The actual travel speed and travel path of the robotic vehicle is then determined based on the target speed and target directions provided in the command sets, and further based on the particularities of the transport device of the robotic vehicle.

8 Claims, 7 Drawing Sheets

CONTROL METHOD FOR AN UNMANNED VEHICLE (ROBOT CAR)

BACKGROUND OF THE INVENTION

1. Field of the Invention

The present invention relates to a control method for a controlling an unmanned vehicle, and more particularly, to control a method designed so that any type of unmanned vehicle, the travel section of which is equipped with wheels, crawlers, etc., can be controlled by commands upplied from control section.

2. Description of the Prior Art

Research concerning the development of self-contained unmanned vehicles (robot cars) is currently being carried out on a very active scale. The existing types of unmanned vehicle are designed so that the travel sections thereof are equipped with wheels, crawlers, etc., and in which the travel motion is accomplished under the control of a control section.

FIG. 7 is a block schematic diagram of the construction of a conventional self-contained unmanned vehicle whose travel section is equipped with wheels. As shown in the figure, item 2 denotes the control section, item 3 the wheel drive section, items 4a and 4b the motors driving the left and right wheels 5a and 5b, respectively, whereby the wheel drive section 3, the motors 4a and 4b, and the wheels 5a and 5b constitute the travel section 6.

If, with this construction, a target location is given, the control section 2 will search the travel path until the target location is reached and use the results of this search to establish the travel commands (hereinafter called commands) and supply the commands to the wheel drive section 3. The wheel drive section 3 will read (decipher) the commands and drive wheels 5a and 5b in accordance with the command.

FIGS. 8(a) and 8(b) show examples of a conventional command (GO command) scheme. If, for example, a set of GO commands consisting of the GO commands 60, 100, 10, 30, 2000 is furnished by the control section 2 to the wheel drive section 3 (FIG. 8(a)), the wheel drive section 3 will read (decipher) the commands to drive the unmanned vehicle as shown in FIG. 8(a). The unmanned vehicle 1 will thus be set in a rectilinear forward motion along the x-axis, start to negotiate a curve at the point corresponding to x=60 cm, and pass the coordinates x=100 cm and y=10 cm in a direction forming an angle of 30° with respect to the x-axis, whereupon it will again travel in a rectilinear forward motion. If, therefore, the new rectilinear forward direction is given as having the new coordinate axis x1, it follows that the new coordinate axis x1 and the old coordinate axis x form an angle of 30° with respect to each other. The travel speed is a constant speed of 2 km (=2000 mm) per hour.

If another set of GO commands consisting of the GO commands 100, 50, 80, 135, and 0 (FIG. 8(b)) is given, the robot car 1 advances in a rectilinear forward motion along the x-axis and proceeds until it reaches the location corresponding to x=100 cm, at which point it will enter a sharp bend and proceed until it reaches the coordinates x=50 cm and y=80 cm and come to a rest at a point forming an angle of 135° with respect to the x-axis. In this instance, the travel speed is slowed down at a constant rate of deceleration so that the vehicular speed will be brought to zero when the point corresponding to x=50 cm and y=80 cm is reached.

By this scheme, the wheel drive section 3 reads (deciphers) the commands furnished by the control section to drive the wheels 5a and 5b. For controlling the wheels 5a and 5b, it is therefore sufficient for the wheel drive section 3 to consider only the local coordinates. Furthermore, the control section 2 searches the travel path and establishes the commands by checking the coordinates of the given universe so that the robot can travel to the destination location.

(Problems the Present Invention Purports to Resolve)
However, the conventional type of unmanned vehicle (robot car) described hereinabove has the following shortcomings.

(1) The control section is required to provides very detailed instructions, including such details as the incipient point of entry of a curve and the final point of a curve. Since these point locations will be different according to whether the travel section is equipped with a certain type of locomotive device, such as wheels, crawlers, or mobile legs, it follows that the commands will have to be different in accordance with the nature or shape of the travel section (travel function) so that the program of the control section will be largely dependent upon the nature or shape of the travel section.

To demonstrate the above-noted problem reference is made to in FIG. 9 and FIG. 10. Assume that the travel speed V1 is specified as being a relatively high velocity until the vehicle reaches node N2. If a sudden stop is specified at the next node N3, it may not be possible to fully control the vehicle's inertia, depending on the nature or shape of the travel section, so that deceleration results as shown by the continuous line, even though the vehicle should be decelerated as shown by the dotted line in FIG. 9. As a result, the vehicle will not come to rest until is has overshot the target location of node 3. To prevent such overshooting due to inertial forces, it is necessary, as shown FIG. 10, to specify a relatively lower speed V2 at the moment in which the vehicle has traversed node N1 to compensate for the particular nature or shape of the travel section. This implies, however, that the program of the control section is significantly dependent upon the nature or shape of the travel section. If, furthermore, the vehicle travels at a low speed from node N1 to node N2, the travel time will increase, so that, as a result, the operational productivity will decrease.

(2) When no particular command is given as the vehicle passes through a bend or curve, the vehicle will, therefore, not be able to negotiate the bend or curve along the normal path, due to the particular nature or shape of the travel section, given that the vehicle travels at a constant speed. As a result, the unmanned vehicle will not be capable of smoothly negotiating curves or bends.

SUMMARY OF THE INVENTION

The object of the present invention is to provide a travel control method or system for an unmanned vehicle (robot car) capable of stopping in an exact predefined stop position, irrespective of the nature or form of a travel section, and also capable of smoothly negotiating curves and bends.

For this purpose, the present invention tries to ensure that the control section, receiving its travel commands from the control section, will previously read all travel commands N+1, N+2, etc. relating to the nodes subsequently traversed after the travel command N relating to the node to be traversed next, and will refer to the previously read travel commands N+1, N+2, etc. relating to all subsequent nodes to be traversed thereafter, to correct the speed pattern specified on the basis of the travel command N in accordance with the inherent travel function so that, regardless of the form and nature of the travel section, whether wheels or crawlers, so as to ensure that the vehicle will stop in the exact pre-defined stop position, and to achieve smooth travel performance in curves and bends to facilitate travel operations.

DETAILED DESCRIPTION OF PREFERRED EMBODIMENTS

An embodiment of the present invention will be described with reference to the drawings as follows.

Figure 1:
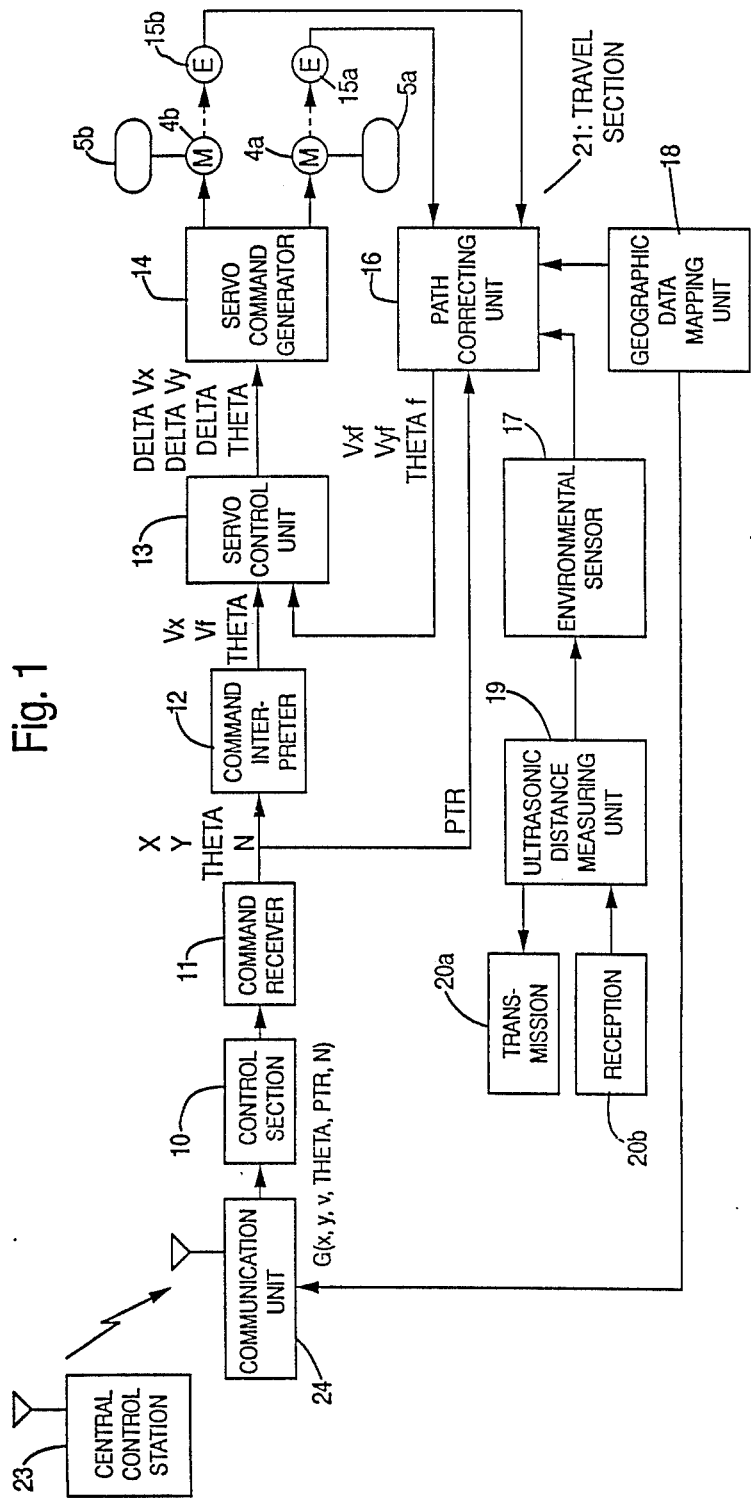
FIG. 1 is a block schematic diagram of the electrical configuration of an embodiment of the unmanned vehicle according to the present invention.

In FIG. 1, item 10 denotes a control section. When the control section 10 receives, via a signal transmission device 24, the target location (destination) nodes specified by wireless transmission from a central station 23 for controlling a plurality of unmanned vehicles, the control section 10 will search for the optimum travel path on the basis of the geographic data stored in the geographic mapping section 18, to be explained hereinafter, and will define the nodes to be traversed in approaching the target location (destination) to establish and output, in the correct sequence, the commands required to traverse along a pre-determined travel path connecting, in the correct sequence, these nodes. Item 11 denotes a command receiving unit which receives the commands supplied, in the correct sequence, from the control section 10, and which consists of a first-in first-out (FIFO) buffer. The command-receiving unit 11 supplies the incoming commands to the command-interpreting unit 12 and the track-correcting unit 16.

The commands referred to above are of the following form: GO (x, y, v, $\theta$, ptr, N) ... (1), where x=travel distance in the x axis direction (its value being positive for forward motion and negative for backward motion);

where y=travel distance in the y axis direction (its value being positive for forward motion and negative for backward motion);

where v=the resultant speed obtained by combining the speeds in the x and y-axes;

where $\theta$=angle of rotation (its value being positive for rotation in the counter-clockwise direction); and where ptr=data quantity pointer.

N denotes the number of the node reached after the execution of a command. That is, a command provides, for each x, y component, the travel distance node N reached after command execution. It also provides the travel speed v, the angle of rotation $\theta$ applicable until the next node is reached as well as the data quantity pointer ptr and the node number N. The path given by a series of commands takes the shape of a curved track connecting a multiplicity of nodes. Nodes can be any change point in the travel condition, such as stop locations, turn-off points, operating and service points. Further, the data quantity pointer ptr defines data groups, such as the data for the distance to the left and right walls and the data for the change points on the wall (edge). The data quantity pointer data are compared with the data obtained from an ultrasonic sensor described hereinafter for use in the correction of the actual position of the unmanned vehicle.

In addition to the Nth command relating to the node to be traversed next, the control section 10 will provide, through the command receiving unit 11, after having previously received the command, the N+1th command for the node to be traversed thereafter, to the command-interpreting unit 12.

The command-interpreting unit 12 interprets the commands provided thereto in the form of a curved path, as described above, and establishes the travel pattern of the unmanned vehicle. That is, the command-interpreting unit 12 will determine the optimum speed and operating (rotation) patterns (see FIG. 4) by interpreting them as the travel patterns for executing, for each x and y component, the travel distance, travel speed v, and angle of rotation $\theta$ provide under a series of commands, and outputting the speed pattern signals vx for the x-axis component, the speed pattern signals vy for the y-axis component, and the rotation pattern signals $\theta$ to feed these pattern signals to the servo control (command-establishing) unit 13. To ensure that the optimally suited patterns for the particular travel equipment used (in the present embodiment, this consists of wheels) are achieved, the above travel patterns are modified in accordance with the nature or type of the travel system used.

In addition to the Nth command given by the previously described control section 10, the command-interpreting unit 12 reads the next N+1th command beforehand and uses this previously read N+1th command as reference data for the appropriate correction of the speed pattern established on the basis of the Nth command so as to obtain a suitable pattern for the travel system in question. During the unmanned vehicle's travel motion towards the Nth node, the vehicle will already have recognized, at the previous N+1th node, whether, for example, the vehicle will stop or enter a curve so that the speed pattern can be corrected to allow for previous deceleration before the required stopping or turning distance.

The servo control (command-establishing) unit 13 reads the pattern signals vx, vy, and $\theta$ supplied from the command interpreting unit 12 and combines these with the feedback signals vxf, vy, and $\theta f$ to be explained hereinafter to compute the deviation signals $\Delta vx$, $\Delta vy$, and $\Delta \theta$ for input, after conversion to analog signals, into the servo controller 14. The servo controller 14 will control and drive the motors 4a and 4b in such as manner that the deviation signals are nil.

The rotational speed of motors 4a and 4b is converted to corresponding electrical pulses by the encoders 15a and 15b which are coupled with the rotating shafts of motors 4a and 4b and supplied to the track correcting section 16.

The path correcting unit 16 counts the pulse signals transmitted from encoders 15a and 15b to determine the travel distance and to establish the speed feedback signals vxf and vyf. Since, in the present embodiment of the invention, wheels are used as the travel system, only feedback signals for the x-axis will be obtained.

The path-correcting unit 16 determines the angle of rotation from the difference between the left and right pulse signals and corrects this value to establish the feedback signal $\theta f$. The correction is performed by comparing the data transmitted from the environmental sensor 17 with the geographic data stored in the geographic mapping unit 18 and read out with the data pointer ptr as the key.

The correction procedure is explained in the following. The geographic mapping unit 18 is equipped with a memory device for storing the distances to the left and right side walls of the travel path by letting these correspond to the distance from the nodes so that, with each change point on the wall (edge), the distances from the nodes and the distances to the left and right side walls are stored in the memory. One entire series of data from node to the next is made to correspond to one data pointer ptr and the geographic data corresponding to the data pointer specified under a command are read out.

The actual distances from the unmanned vehicle to the left and right side walls, however, are measured by the ultrasonic distance measuring unit 19. That is, the ultrasonic distance measuring unit 19 drives the ultrasonic transmitter 20 to emit an ultrasound wave towards the wall, and the reflected wave is received by the receiver 20b so as to measure the distance from the unmanned vehicle to the wall on the basis of the duration of the time period from the emission of the ultrasound wave to the reception of the reflected wave. The result of this measurement is fed to the environmental sensor 17 so that said environmental sensor 17 will detect the point at which the distance to the wall changes, i.e., it will detect the edge.

The path correcting unit 16 reads out from the geographic mapping unit the geographic data specified by the data quantity pointer ptr and performs the following two types of correction by comparing the actual distance to the left and right side walls supplied by the environmental sensor 17 and the distance from the node to the edge with the geographic data.

(1) On the one hand, the path correcting unit 16 corrects the angle of rotation so that the distance to the left and right side wall becomes roughly identical, in other words, in such a manner that the unmanned vehicle will pass practically through the center of its travel path, and then generates the rotation angle feedback signal f.

(2) On the other hand, the path correcting unit 16 counts the pulse signals supplied from the encoders 15a and 15b and if the actual travel distance from the node to the edge differs from the travel distance obtained from the geographic data, it will correct the distance by adjusting this differential. In other words, it will perform a soft correction by adding to, or subtracting from, the above pulse signal count the differential.

In essence, the above corrections consist of a positional correction in the left and right directions by the angle of rotation on the basis of the distance from the unmanned vehicle to both side walls on the one hand, and of a soft correction of the encoder count by detection the edge of the wall (i.e., the point of change) on the other.

Figure 2:
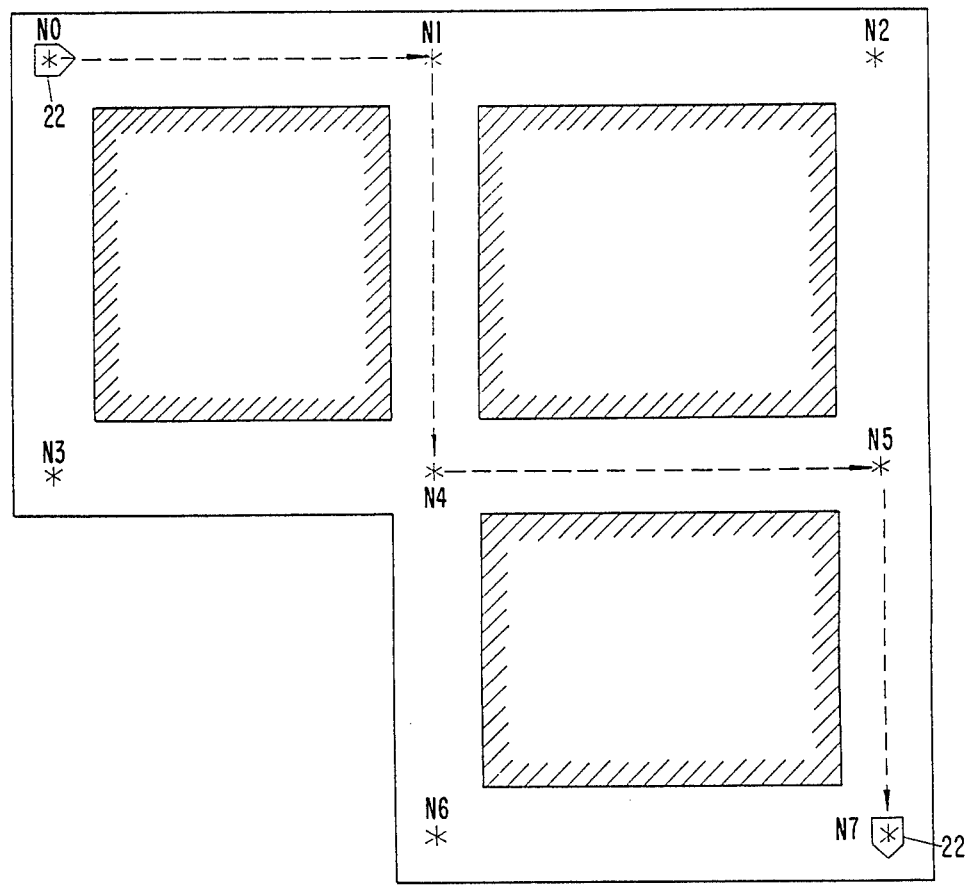
FIG. 2 is a ground plan view showing an example of the travel path traversed by an unmanned vehicle.

The foregoing describes the configuration of the present embodiment of this invention, whereby the aforementioned component elements 4a, 4b, 5a, 5b, and 11-20 constitute the travel section 21, while the control section 10 and the travel section 21 make up the unmanned vehicle 22 (FIG. 2). The geographic mapping section 18, however, is shared as a common part between the control section 10 and the travel section 21. Since, furthermore, the present embodiment uses wheels as the travel device, it can travel in only one direction, for example, in the direction of the x-axis only, without having a speed component in the y-axis direction.

The operation of the present embodiment is described as follows with reference to FIGS. 2-6. The following describes the movement of the unmanned vehicle 22 from node N0 to node N7 as an example, wherein the unmanned vehicle 22 begins at node N0 and faces in the direction of the next node N1. For greater convenience of description, the distance between consecutive nodes is given as 10 m.

If node N7 is specified as the target location (destination) from the central station 23, the control section 10 receiving this instruction will search for the shortest path from node N0 to node N7 on the basis of the geographic stored in the geographic mapping unit 18 and determine the path from N0-N1-N4-N5 to N7. This search can be performed by any of the familiar search methods such as a vertical or a horizontal search. When the travel path has been determined in this manner, the control section 10 will generate the following command series for transmission to the travel section 21.

(1) GO (10000.0.2000.0.$P_0.N_1$)
(2) GO (10000.0.2000. $-15708.P_1.N_4$)
(3) GO (10000.0.2000. $+15708.P_2.N_5$)
(4) GO (10000.0.2000.15708.$P_3.N_7$)
(5) WAIT (0.1.0)

The initial component within the parentheses, i.e., 10000, indicates the distance between consecutive notes being 10 m (=10000 mm). The second component is 0, signifying that the distance component in the y-axis direction is zero. The third component, given as 2000, indicates that the travel speed should be 2 km per hour (=2000 mm per hour). Further, the term $-15708$, given as the fourth component, corresponds to $\pi/2 = 3.1416/2 = 1.5708$. The angle of rotation is given as $-90°$ C., indicating that rotation should be in the clockwise direction by an angle of 90°. Finally, the fifth and sixth terms indicate, as has already been pointed out, the data quantity pointer ptr and the node of next call, that is, the node at which the unmanned vehicle is to arrive next. The WAIT command, given in the form WAIT (0.1.0) specifies a temporary stop. The terms within the parentheses denote in 0/1 notation the instructions: slow deceleration stop/sudden stop; brake application/no brake application after stop; and servo on/off, respectively.

Figure 3:
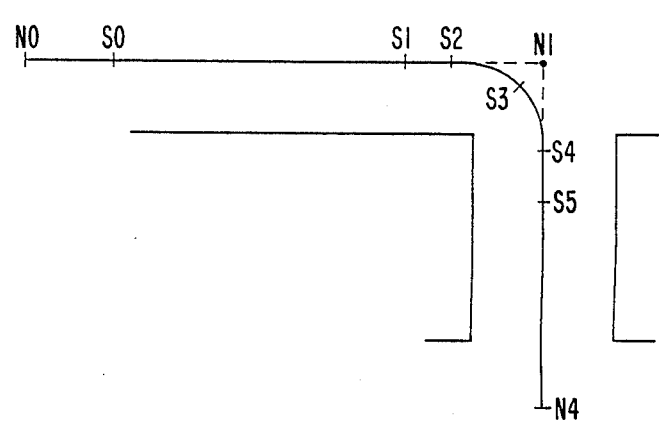
FIG. 3 is a ground plan view showing the actual travel path traversed by an unmanned vehicle passing from node N0 through node N1 to node N4.
Figure 4:
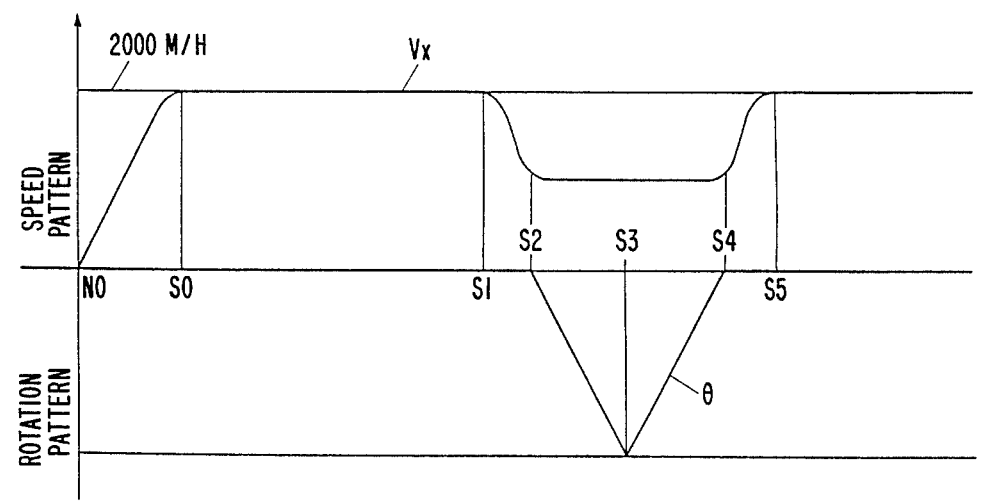
FIG. 4 is a waveform diagram showing the speed and operating patterns for the unmanned vehicle of FIG. 3.

When the commands are received by the command-receiving section 11 in this manner, the command-interpreting unit 12 produces an image of the travel path as shown in FIG. 3 from the above commands (1) and (2) (Nth command and N+1th command) to generate the speed pattern vx and the rotation pattern $\theta$, as shown in FIG. 4.

The speed pattern vx here consists of a segment with gradual acceleration from node N0 to point S0, a travel segment at constant speed from point S0 in which the unmanned vehicle has reached a speed of 2000 m/h, and a travel segment of gradual deceleration from the location S1 just prior to the corner at node $N_1$.

The rotation pattern $\theta$, however, consists of a curve entry at point S2 which is the beginning of a right-hand turn, causing the unmanned vehicle 22 to negotiate a right-hand corner, and a curve entry in the opposite direction at point S3 which is the beginning of a turn in the opposite direction, causing the unmanned vehicle 22 to negotiate a 90° corner to return to a rectilinear travel motion. The speed pattern vx consists of a resumption of acceleration at the above point S4 and a return to a travel speed of 2000 m/h at point S5.

This speed pattern vx and the rotation pattern are transmitted to the servo control (command-generating) section, combined with the feedback signals vxf and $\theta f$ from the path correcting unit 16 to generate the deviation signals $\Delta vx$ and $\Delta \theta$ to be supplied to the servo control unit 14 so as to permit travel in accordance with the above travel pattern.

In this instance, the geographic data are read from the geographic mapping unit 18 in accordance with the data quantity pointers P0 and P1 and the above correction, that is, a correction ensuring that the unmanned vehicle 22 passes in the center of its travel path, and a correction of the pulse count from encoders 15a and 15b.

Figure 5:
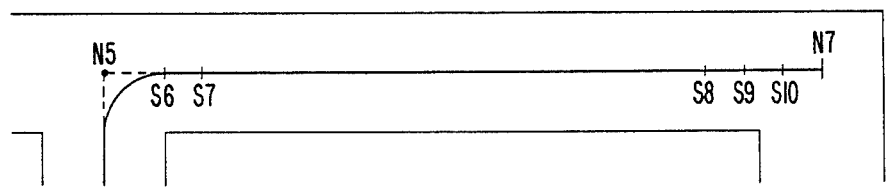
FIG. 5 is a ground plan view showing the actual travel path traversed by an unmanned vehicle passing from node N5 to node N7.
Figure 6:
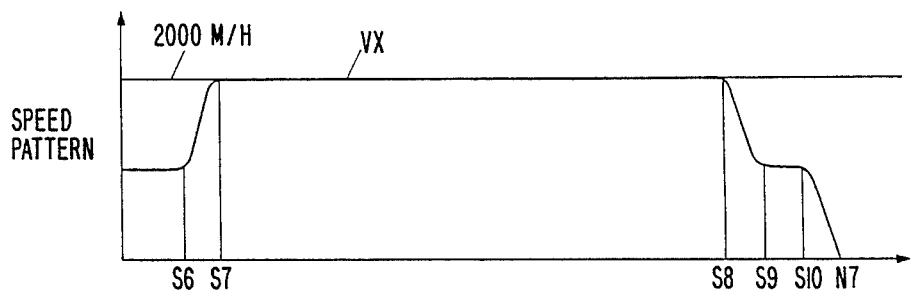
FIG. 6 is a waveform diagram showing the speed and operating patterns for the unmanned vehicle of FIG. 5.
Figure 7:
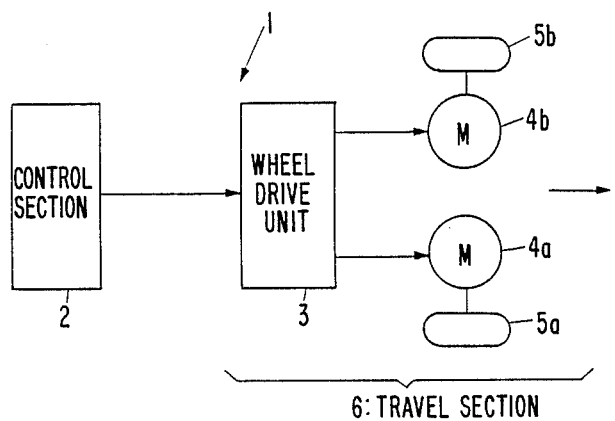
FIG. 7 is a block shematic showing the electrical configuration of a conventional unmanned vehicle.
Figure 8A:
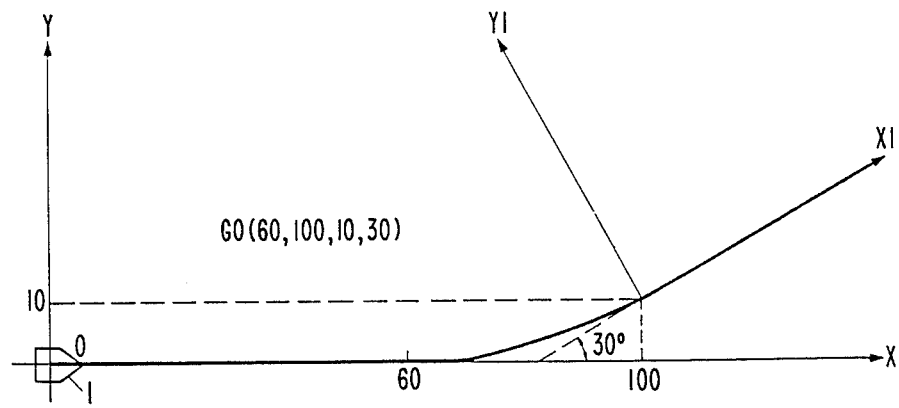
FIGS. 8(a) and 8(b) show a ground plan view for explaining the commands used by the conventional unmanned vehicle.
Figure 8B:
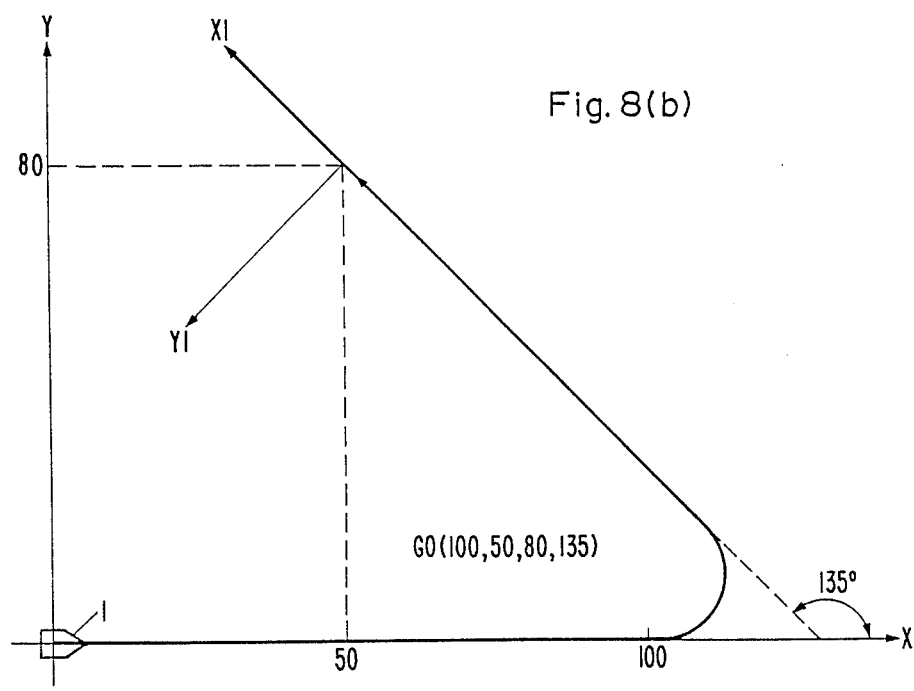
Figure 9:
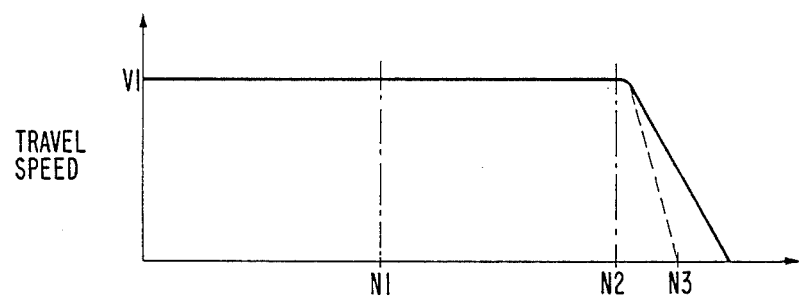
FIGS. 9 and 10 are waveform diagrams of the speed and operating patterns for the conventional unmanned vehicle.
Figure 10:
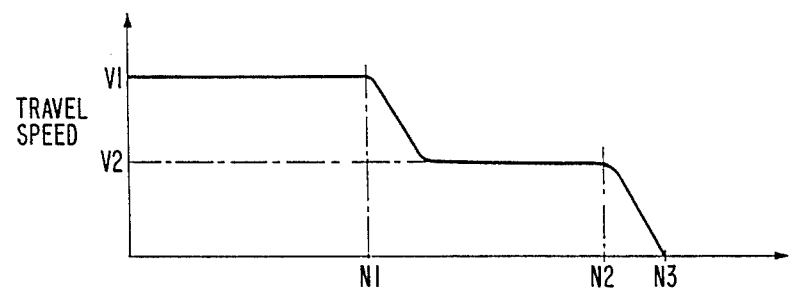

In the same manner, travel is controlled so that the unmanned vehicle 22 passes from node 4 to node 5 in accordance with commands (2) and (3). Under commands (3), (4), and (5), the unmanned vehicle 22 is controlled so that it travels from node N5 to node N7. In this instance, commands (3) and (4) and commands (4) and (5) serve to image the travel path, as shown in FIG. 5. The speed pattern vx is generated as shown in FIG. 6. That is, the speed pattern vx thus consists of a portion of incipient acceleration at point S6 in which the corresponding operation is completed at node 5, a portion in which the unmanned vehicle reaches a speed of 2000 m/h at point S7, and a subsequent portion of travelling at constant speed until point S8 is reached. From point S8, located at a pre-determined distance forward of node N7, the speed is gradually decelerated so that the unmanned vehicle will travel at a low speed from point S9 to point S10. Under the WAIT command (5), the unmanned vehicle is decelerated at point S10, located at a pre-determined distance forward of node N7, and the brakes are applied at the moment in which the unmanned vehicle 22 has reached node 7 so that the unmanned vehicle 22 will stop.

In the above example, the unmanned vehicle 22 reaches its destination solely by forward motion (travel in the x-axis). If, however, the vehicle cannot enter a curve because the intersection is too narrow, it is possible that simultaneous cross travel (travel in the y-axis direction) may take place. In this instance, the travel system may have an omnidirectional movement capability of the type described, for example, in Japanese Patent Disclosure No. 59-184062, whereby the following commands may be used for control.

(1) GO (10000.0.2000.0.$P_0.N_1$)
(2) GO (0, −10000.0.2000.−15708.$P_1.N_4$)
(3) GO (10000.0.2000.0. P2.N5)
(4) GO (0.−10000.2000.0.P3, N7)
(5) WAIT (0.1.0)

After the unmanned vehicle has moved forward, under such a series of commands, and has advanced from node N0 of FIG. 2 to node N1, it will the move sideways from node N1 to node N4 and resume its forward motion from node N4 to node N5, and then move sideways again from node 5 to reach the target location (destination) node 7.

In the example shown in FIG. 2, the passage is a straight, unbranched route so that only sideways motion can be accommodated. If the passage has intersections in the cross-direction, the unmanned vehicle will also be capable of moving in the diagonal direction by allocating values different from zero to the x and y components.

In accordance with the present invention, the travel section 21 generates, under the commands from the control section 10, the optimum travel path (track) and travel speed for the travel devices used therein (wheels, crawlers, etc.) to ensure smooth conveyance. The control section 10 is independent of the travel devices used and the programming of the control section 10 need not be changed even when the travel devices are changed. The control section 10 can also be applied, without difficulty, to travel devices in all directions.

In the aforementioned embodiment of the present invention, the control section 10 and the travel section 21 may consist of separate, independent processors or a common processor operating on a time-sharing basis. It is also possible to interlink several processors and process the data on a reciprocal basis.

Furthermore, the program of the travel section 21 may be a special program for each individual type of travel device. Alternatively, a versatile program may be used capable of handling the various types of travel devices by means of a travel-device recognizing function.

The environmental sensor may not necessarily be an ultrasonic sensor, and other types of sensing or detecting devices may be employed.

As explained above, apart from the Nth travel command relating to the node to be traversed next, the travel section according to the present invention reads in advance all subsequent travel commands, that is, the N+1th, N+2th, etc. commands relating to the nodes to be traversed thereafter, so as to correct, in accordance with its own travel capabilities, the speed pattern determined on the basis of the Nth travel commands by using the pre-read subsequent travel commands, that is, the N+1th, N+2th etc. commands. As a result, the travel section is always capable of stopping at the precise pre-determined stopping position, irrespective of the nature or form of the travel section, that is, irrespective of whether the travel section is equipped with wheels, crawlers, feet, etc. This also ensures smooth travel in curves and bends and is an effective means of providing for smooth travel operation.

What is claimed is:

1. A method for controlling a robotic vehicle having a control section and a travel section, the travel section being equipped with a transport device for transporting the robotic vehicle from a start location to a target location, said method comprising the steps of:

(a) supplying to the control section the target location;

(b) determining an optimal nodal path from the start location to the target location, the optimal nodal path being defined by a plurality of successive nodes, wherein each of the plurality of successive nodes represents a proximity at which the robotic vehicle changes direction;

(c) preparing a plurality of command sets for each of the plurality of successive nodes respectively, each command set specifying at least a target speed and target direction of the robotic vehicle as the robotic vehicle is transported from a vicinity of one node to a vicinity of a next node;

(d) outputting the plurality of command sets from the control section to the travel section;

(e) determining an actual travel speed and travel path of the robotic vehicle as the robotic vehicle is transported from a vicinity of a first node to a vicinity of a second node and then to a vicinity of a third node, wherein the actual travel speed and travel path between the first node and the second node is determined based on the target speeds and target directions specified in a command set for the second node and a command set for the third node, and is further based on characteristics of the transport device of the robotic vehicle.

2. A method as recited in claim 1, further comprising the step of sensing physical barriers external to the robotic vehicle, wherein the actual travel speed and travel path is further based on any physical barriers sensed while the robotic vehicle is transported from node to node.

3. A method as recited in claim 2, further comprising the step of equipping the transport device with a transverse motion capability.

4. A method as recited in claim 3, further comprising the step of equipping the transport device with an oblique motion capability.

5. A method as recited in claim 2, further comprising the step of equipping the transport device with an oblique motion capability.

6. A method as recited in claim 1, further comprising the step of equipping the transport device with a transverse motion capability.

7. A method as recited in claim 6, further comprising the step of equipping the transport device with an oblique motion capability.

8. A method as recited in claim 1, further comprising the step of equipping the transport device with an oblique motion capability.

* * * * *